Jan. 12, 1965   E. A. HALL   3,165,166
SILENCER DEVICE FOR HYDRAULIC JACKS
Filed Dec. 5, 1963
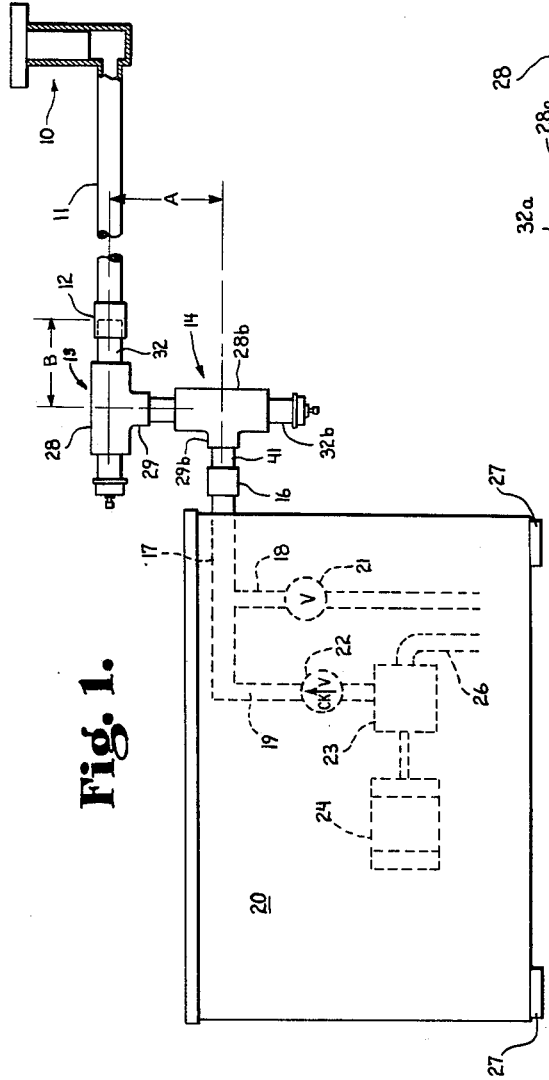
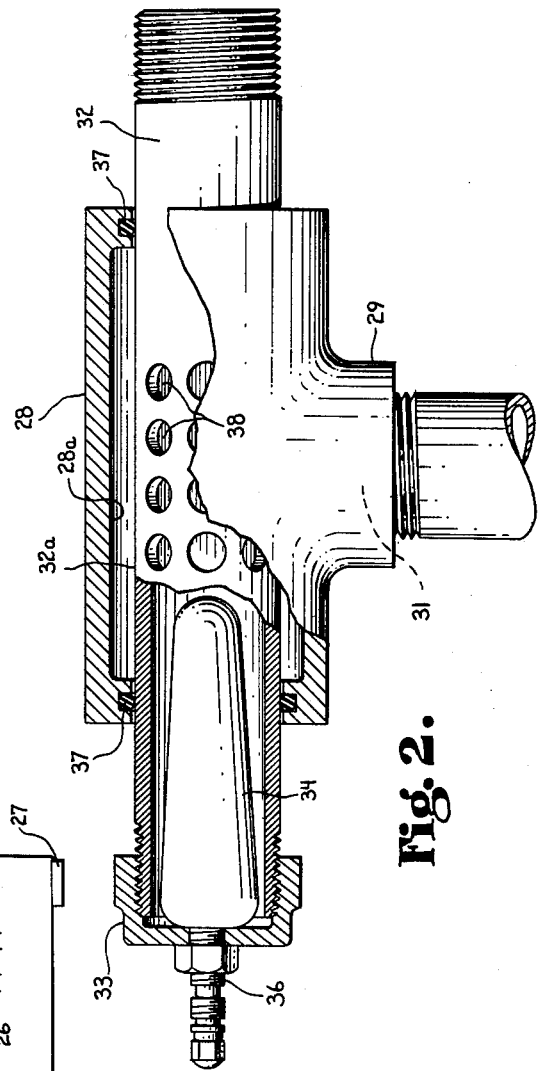
INVENTOR.
Ernest A. Hall
BY
Lockwood, Woodard, Smith & Weikart
Attorneys United States Patent Office 3,165,166
Patented Jan. 12, 1965

1

3,165,166
SILENCER DEVICE FOR HYDRAULIC JACKS
Ernest A. Hall, Morristown, Ind., assignor to The White-Evans Elevator Co. Inc., Indianapolis, Ind., a corporation of Indiana
Filed Dec. 5, 1963, Ser. No. 328,308
6 Claims. (Cl. 181—47)

This invention relates generally to noise suppressing or silencing devices for hydraulic systems and in particular to a silencer device for hydraulic jacks or elevators.

In modern low-rise buildings, hydraulic elevators are coming into increased use for passenger service. Their use is inhibited somewhat because they are inherently noisy due to the transmision of mechanical vibration and noise through the system piping and through the hydraulic fluid. An effective silencing or noise attenuating device has thus become a necessity for wider utilization of hydraulic systems in elevators. In the past it has been conventional to utilize a length of high pressure rubber hose between the pump and the rigid conduits of the system for isolating pump-generated vibrations from the system. Such an arrangement does not, however, prevent vibrations from traveling through the fluid into the system and is not safe with regard to blowout of the hose. Many states have now adopted a construction code which prescribes the use of such flexible pump-system couplings.

It is the primary object of the present invention to provide a silencer device for hydraulic elevators or jacks which vibrationally isolates the pumping unit from the rigid fluid conduits of the system and which retards the transmission of vibration through the hydraulic fluid itself.

A further object of the present invention is to provide a silencer device of the type referred to which accommodates itself to settling or shifting of either the pumping unit or the rigid fluid lines and accommodates itself to misalignment of the line from the pumping unit and the rigid fluid system line.

These and other objects will become apparent as the description proceeds with reference to the accompanying drawings in which:

FIG. 1 is a side view of the structure of the present invention including a schematic showing of the environmental pumping unit and jack.

FIG. 2 is a detailed side view of one of the two duplicate assemblies which embody the present invention, with portions broken away to more clearly show the interior construction.

Referring initially to FIG. 1, there is schematically shown at 10 a hydraulic elevator or jack. A rigid fluid line 11 extends from the jack and is joined by means of a pipe coupling 12 to one of the duplicate assemblies embodying the present invention and indicated schematically at 13. The assembly 13 is connected to the second of the duplicate assemblies embodying the present invention indicated schematically at 14, the assembly 13 being described subsequently in detail with reference to FIG. 2. The assembly 14 is connected by means of the pipe coupling 16 to a rigid fluid line 17 extending from a generally rectangular pumping unit enclosure indicated at 20.

The pumping unit enclosure and the components of the hydraulic system enclosed therein form no part of the present invention and are not described in detail herein. Conventionally, the line 17 communicates with branch fluid lines 18 and 19 with the branch 18 having connected therein a remotely controlled valve 21. The valve 21 controls the passage of fluid through the line 18 to the lower or sump portion of the pumping unit. The branch 19 contains a check valve 22 and is connected to the discharge side of a conventional, positive displacement pump 23, the pump being driven by a conventional electric motor 24. The suction line 26 of the pump is in fluid communication with the sump. Preferably, the pumping unit is supported on rubber pads 27 at each of its four corners.

Referring to FIG. 2, the assembly 13 includes a tubular housing 28, flanged and internally threaded as indicated at 29 intermediate its ends to provide an aperture 31 opening into the interior of the housing. A rigid tube 32 extends through the housing, the tube having one end closed by the cap 33.

Supported on the cap is a flexible container filled with a resilient material which as shown in FIG. 2. may take the form of a bladder 34 filled with air. The bladder is supported by a conventional inflating valve assembly 36 which is accessible from the exterior of the cap 33 for inflation of the bladder. The interior surface 28a of the housing is spaced from the exterior surface 32a of the tube and the ends of the housing are flanged inwardly and accommodate resilient seal rings 37 which bear against the tube 32. The rings 37 thus seal the opposite ends of the housing against the tube, but the dynamic seal thus provided permits axial and rotational movement of the tube with relation to the housing.

The portion of the tube 32 within the housing 28 is provided with a series of closely spaced ports 38 which provide fluid communication between the housing aperture 31 and the interior of the tube. The open end of the tube 32 is threaded or otherwise adapted for attachment to the hydraulic system fluid line 11 as indicated in FIG. 1.

As previously mentioned, the assembly 14 is a duplicate of the assembly 13 and in FIG. 1 the parts which are visible of the assembly 14 are given the same reference numerals as their counterparts in assembly 13 but with the suffix "b." As will be evident from a comparison of FIGS. 1 and 2, the tube 32b of assembly 14 is threaded into the flange 29 on the housing 28 and thus communicates with the interior of the housing 28. The aperture enclosed by the flange 29b of the assembly 14 has communication through the pipe nipple 41 with the fluid line 17.

In operation, when the ram of the jack 10 is to be raised, the pump 23 is operated and supplies fluid under pressure to the jack through the lines 17, and through the assemblies 14 and 13. When the ram of the jack is to be lowered, the valve 21 is opened permitting fluid to move from the jacket to the pumping unit through the line 18 to the sump. This operation of the fluid system is, of course, conventional. With the operation of the pump, moving fluid toward the jack, pressure pulsations in the fluid brought about by the pump operation are absorbed primarily by the resilient bladder in the assembly 14. The turbulence created in the fluid by the forcing of the fluid through the ports in the tube 32b of the assembly 14 serves to retard the transmission of vibration and noise through the fluid itself. Similarly, when the jack ram is lowered so that fluid moves from the jack to the pumping unit, the bladder 34 of the assembly 13 and the ports 38 of the assembly 13 serve to attenuate pressure pulsations and the transmission of mechanical vibration through the fluid.

In any system such as that illustrated in FIG. 1, operation of the pump exerts a reaction torque on the pumping unit assembly itself which tends to bodily rotate it in a direction opposite to the rotation of the pump. It will be evident from FIG. 1 that such reaction torque tends to rotate the pumping unit about the axis of the pipe 41. Since the sealing rings 37 in the assembly 13 do not resist a rotation of the housing 28 about the tube 32, this reaction torque does not exert a distorting stress on the fluid line 11 leading to the jack.

While in the past it has been conventional to attempt to suppress the noise of the pumping unit by mounting it on rubber pads such as those shown at 27 in FIG. 1, this has caused considerable difficulty in that the pumping unit inevitably settles on the rubber pads in time and this produces undesirable stress on the rigid fluid lines of the hydraulic system. With the structure embodying the present invention, an inspection of FIG. 1 will indicate that any settling of the pumping unit on the rubber pads will merely result in a slight increase in the dimension indicated at A in FIG. 1, that is, this shift in relative position will be accommodated by a slight movement of the housing 28b on the tube 32b. Similarly, if there is a misalignment of the fluid line 11 with the tube 32 of the assembly 13 when the silencer device is installed, this can be accommodated by a slight movement of the housing 28 with relation to its tube 32 as indicated by the dimension B in FIG. 1. The flexibility provided by the allowable variation in dimensions A and B and the freedom for rotational movement of the tubes within their respective housings is an important feature of the present invention. It should be further noted that there is no metal-to-metal contact between the housing and the tube in either of the two duplicate assemblies further serving to retard the transmission of mechanical vibrations across the silencer device. This effective attenuation of mechanical vibration and noise by the silencer device serves to protect and prolong the life of the rigid fluid lines of the hydraulic system exemplified in FIG. 1 by the line 11. The swivel coupling of the assemblies permits easy disconnecting of the assemblies from the hydraulic system. By varying the effective length of the tube components of the assemblies, that is, by varying the dimension from the closed end of the tube to the collective center line of the ports through the tube, the device can be tuned to selectively attenuate certain frequencies when desired. It should further be noted that the total summation area of the ports in the tubes is at least equal to the cross-sectional flow area of the tubes so that little or no back pressure is generated by the device.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A silencer device for hydraulic elevators or the like of the type having a pumping unit and a rigid fluid line, said device comprising a first housing and tube assembly including a tubular housing having an aperture therein intermediate its ends, a rigid tube extending axialy through said housing, said tube having one closed end and a flexible container filled with a resilient material within the tube adjacent said closed end, the interior surface of said housing being spaced from the outer surface of said tube with resilient seal rings sealing the opposite ends of the housing against the tube but permitting axial and rotational movement of the tube with relation to the housing, a series of closely spaced ports in said tube providing fluid communication between said housing aperture and the interior of said tube, and a second housing and tube assembly duplicating said first assembly, the open end of the tube of said second assembly being threaded into the aperture in the housing of said first assembly, whereby with the housing aperture of said second assembly connected to the elevator pumping unit and the open end of the tube of said first assembly connected to the rigid fluid line of the elevator, transmission of noise and vibration between the pumping unit and fluid line is retarded, with misalignment of the pumping unit and fluid line being accommodated by the freedom for axial and rotational movement of said tubes relative to their respective housings.

2. A silencer device for hydraulic elevators or the like of the type having a pumping unit and a rigid fluid line, said device comprising a first housing and tube assembly including a tubular housing having an aperture therein intermediate its ends, a rigid tube extending axially through said housing, said tube having one closed end and a resilient fluid pressure pulsation attenuating element within the tube adjacent said closed end, the interior surface of said housing being spaced from the outer surface of said tube with resilient seal rings sealing the opposite ends of the housing against the tube but permitting axial and rotational movement of the tube with relation to the housing, a series of closely spaced ports in said tube providing fluid communication between said housing aperture and the interior of said tube, and a second housing and tube assembly duplicating said first assembly, the open end of the tube of said second assembly being threaded into the aperture in the housing of said first assembly, whereby with the housing aperture of said second assembly connected to the elevator pumping unit and the open end of the tube of said first assembly connected to the rigid fluid line of the elevator, transmission of noise and vibration between the pumping unit and fluid line is retarded, with misalignment of the pumping unit and fluid line being accommodated by the freedom for axial and rotational movement of said tubes relative to their respective housings.

3. A silencer device for hydraulic elevators or the like of the type having a pumping unit and a rigid fluid line, said device comprising a first housing and tube assembly including a tubular housing having an aperture therein intermediate its ends, a rigid tube extending axially through said housing, said tube having one closed end, the interior surface of said housing being spaced from the outer surface of said tube, means providing a dynamic fluid seal between the junctions of said housing and tube permitting axial and rotational movement of the tube with relation to the housing, a series of closely spaced ports in said tube providing fluid communication between said housing aperture and the interior of said tube, and a second housing and tube assembly duplicating said first assembly, the open end of the tube of said second assembly being threaded into the aperture in the housing of said first assembly, whereby with the housing aperture of said second assembly connected to the elevator pumping unit and the open end of the tube of said first assembly connected to the rigid fluid line of the elevator, transmission of noise and vibration between the pumping unit and fluid line is retarded, with misalignment of the pumping unit and fluid line being accommodated by the freedom for axial and rotational movement of said tubes relative to their respective housings.

4. A silencer device for joining two rigid conduits carrying fluid under variable pressure comprising a tubular housing having an aperture therein intermediate its ends adapted to be joined to one of the conduits, a rigid tube extending axially through said housing, said tube having one closed end and an air-filled bladder within said tube and adjacent said closed end, the open end of said tube being adapted to be joined to the other of the conduits, the interior surface of said tubular housing being spaced from the outer surface of said tube with resilient seal rings sealing the opposite ends of the housing against the tube but permitting axial and rotational movement of the tube with relation to the housing, a series of closely spaced ports in said tube providing fluid communication between said housing aperture and the interior of said tube whereby with said device connected between said conduits transmission of vibration and fluid pulsation between the conduits is retarded with the freedom for axial and rotational movement between said tube and housing permitting accommodation of misalignment of said conduits.

5. A silencer device for joining two rigid conduits carrying fluid under variable pressure comprising a tubular housing having an aperture therein intermediate its ends adapted to be joined to one of the conduits, a rigid tube extending axially through said housing, said tube having one closed end and a flexible container filled with a resilient material within said tube and adjacent said closed end, the open end of said tube being adapted to be joined to the other of the conduits, the interior surface of said tubular housing being spaced from the outer surface of said tube with resilient seal rings sealing the opposite ends of the housing against the tube but permitting axial and rotational movement of the tube with relation to the housing, a series of closely spaced ports in said tube providing fluid communication between said housing aperture and the interior of said tube whereby with said device connected between said conduits transmission of vibration and fluid pulsation between the conduits is retarded with the freedom for axial and rotational movement between said tube and housing permitting accommodation of misalignment of said conduits.

6. A silencer device for joining two rigid conduits carrying fluid under variable pressure comprising a tubular housing having an aperture therein intermediate its ends adapted to be joined to one of the conduits, a rigid tube extending axially through said housing and having one closed end, the open end of said tube being adapted to be joined to the other of the conduits, the interior surface of said tubular housing being spaced from the outer surface of said tube with resilient seal rings sealing the opposite ends of the housing against the tube but permitting axial and rotational movement of the tube with relation to the housing, a series of closely spaced ports in said tube providing fluid communication between said housing aperture and the interior of said tube whereby with said device connected between said conduits transmission of vibration between the conduits is retarded with the freedom for rotational movement between said tube and housing permitting accommodation of misalignment of said conduits.

References Cited in the file of this patent
UNITED STATES PATENTS

| | | |
|---|---|---|
| 1,707,912 | Heindorf | Apr. 2, 1929 |
| 2,051,019 | Arutunoff | Aug. 18, 1936 |
| 2,638,932 | Alexander | May 19, 1953 |
| 3,061,039 | Peters | Oct. 30, 1962 |